US007181203B2

(12) United States Patent
Gregori

(10) Patent No.: US 7,181,203 B2
(45) Date of Patent: Feb. 20, 2007

(54) BARRIER MOVEMENT OPERATOR HUMAN INTERFACE METHOD AND APPARATUS

(75) Inventor: Eric Michael Gregori, Lindenhurst, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 510 days.

(21) Appl. No.: 10/624,053

(22) Filed: Jul. 21, 2003

(65) Prior Publication Data

US 2005/0020208 A1 Jan. 27, 2005

(51) Int. Cl.
*H04M 3/00* (2006.01)
(52) U.S. Cl. ............... 455/419; 340/825.69; 348/14.05
(58) Field of Classification Search ................ 455/419, 455/420, 88; 340/825.69, 825.72; 348/14.05
See application file for complete search history.

(56) References Cited

U.S. PATENT DOCUMENTS 5,680,134 A 10/1997 Tsui
5,841,390 A 11/1998 Tsui
6,005,508 A 12/1999 Tsui
6,344,817 B1 2/2002 Verzulli
6,397,186 B1 * 5/2002 Bush et al. ................. 704/274
6,650,248 B1 * 11/2003 O'Donnell et al. .... 340/825.69

FOREIGN PATENT DOCUMENTS

CN 1404032 A 3/2003
FR 2726955 5/1996
WO WO94/28675 A1 12/1994
WO WO01/47130 A1 6/2001

OTHER PUBLICATIONS

Search Report for GB 0416203.8 completed on Oct. 20, 2004.

* cited by examiner

*Primary Examiner*—Lee Nguyen
(74) *Attorney, Agent, or Firm*—Fitch, Even, Tabin & Flannery

(57) ABSTRACT

A programmable transmitter that verbally questions a user with audible questions to determine a type of a transmitter being emulated. The transmitter receives indicia of the type the transmitter and determines the type of the necessary transmission parameters based upon the received indicia. For operator system types that utilize DIP switch programming, the transmitter provides a voice menu of possible DIP switch settings and the user responds to the voice menu. The transmitter receives responses from the user via buttons and/or the user's voice commands.

29 Claims, 5 Drawing Sheets

BARRIER MOVEMENT OPERATOR HUMAN INTERFACE METHOD AND APPARATUS

FIELD OF THE INVENTION

The present invention relates generally to radio frequency transmitters and, in particular, to programming a radio frequency transmitter.

DISCUSSION OF THE RELATED ART

Garage doors, gates and movable barriers commonly employ operators which may be remotely controlled from hand-held radio frequency (RF) transmitters. Over the years, several companies have introduced different types of communication schemes for their operators and RF transmitters. For example, manufactures have designed their operators and RF transmitters to communicate using particular carrier wave frequencies, and particular carrier wave modulation techniques. In addition, many manufacturers have incorporated coding schemes into their RF transmitters and operators to provide system security. For example, many manufacturers have implemented a fixed code system wherein a user is able to select a particular code by, for example, setting DIP switches in both the RF transmitter and operator to the same sequence.

With the advent of remote RF transmitters, a need arose for users to replace lost or broken RF transmitters or to add additional RF transmitters to allow other users to control an operator. To meet this need, universal RF transmitters were developed that, when programmed, allowed users to control a variety of manufacturer's operators. In order for a universal RF transmitter to control an operator, however, it must be programmed to transmit the same carrier wave frequency, with the same carrier wave modulation and the same code that the operator uses.

To program some universal transmitters a user must open the housing of the universal transmitter and relocate jumper connections and switch tiny DIP switches. Such a programming procedure is burdensome for most people and may be impossible for people without either the requisite visual acuity or physical dexterity required to properly locate and move jumpers and/or DIP switches.

Additionally there are a variety of problems associated with DIP switches, in that they are relatively costly, unreliable and users can inadvertently change the fixed command code. Moreover, codes set with DIP switches are visible and can be easily misappropriated or copied to a like transmitter.

SUMMARY OF THE INVENTION

The arrangements described and claimed herein comprise methods and means for implementing the programming a universal transmitter, including the steps of: audibly questioning a user, by the transmitter, to determine a type of system with which the transmitter is to be used; receiving, at the transmitter, a response by the user to the questioning; and identifying the type of system with which the transmitter is to be used based on the response. The user responses are then used by the transmitter to perform a configuration which allows the transmitter to control the operator in question.

A programmable transmitter as described herein includes a radio frequency portion configured to transmit, a user input control configured to receive a user input and a processing portion configured to operate a voice synthesizer to audibly question a user to determine a type of system with which the transmitter is to be used. The processing portion is configured to receive a response via the user input control, identify the type of system with which the transmitter is to be used based upon the response, and transmit at a frequency for the type of system via the radio frequency portion.

BRIEF DESCRIPTION OF THE DRAWINGS

The above and other aspects featured and advantages of the present invention will be more apparent from the following more particular description thereof presented in conjunction with the following drawings herein.

Corresponding reference characters indicate corresponding components throughout several views of the drawing.

DESCRIPTION

The following description is not to be taken in a limiting sense, but is made for the purpose of describing the general principles of the invention. The scope of the invention should be determined with reference to the claims.

Figure 1:
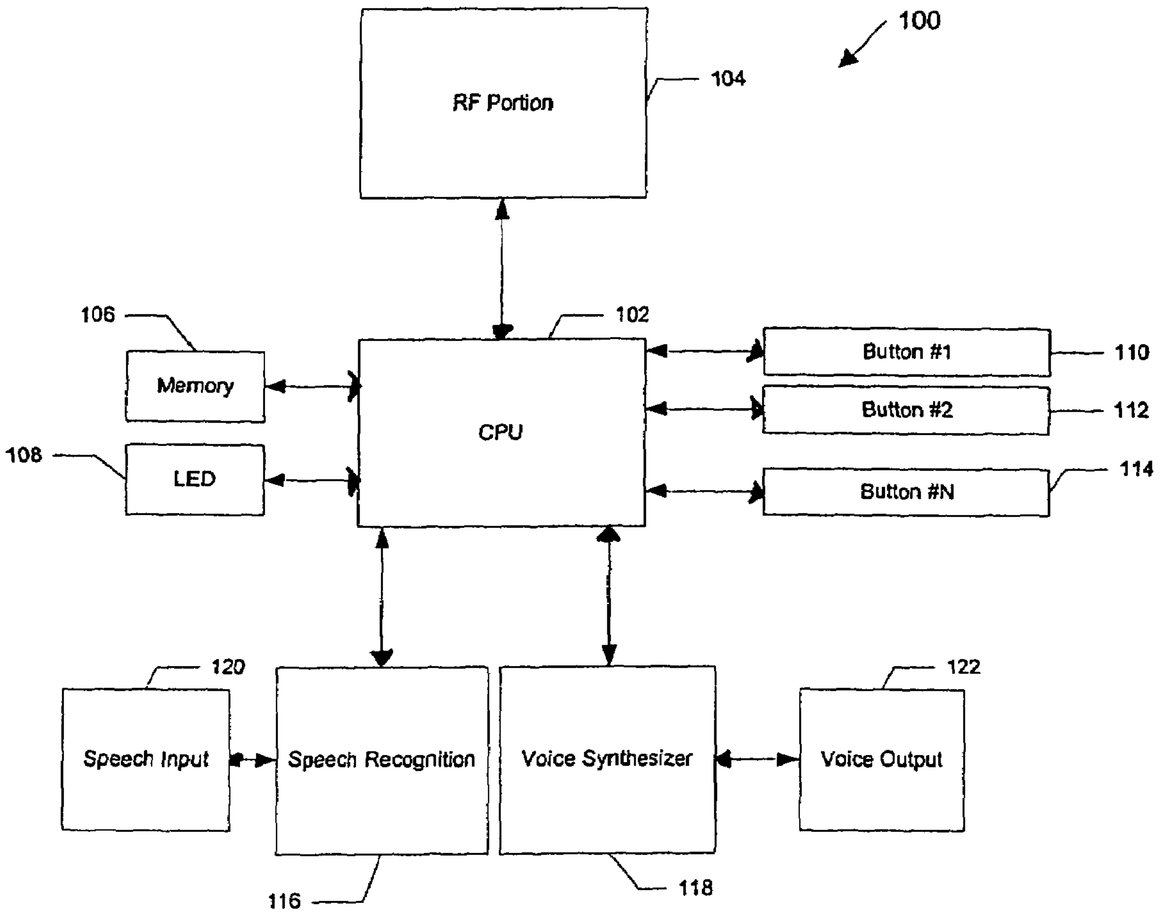
FIG. 1 is a functional block diagram of a universal transmitter with voice assisted programming system.

FIG. 1 is a functional block diagram of a universal transmitter 100 with a voice assisted programming system. Shown are a CPU 102 coupled to an RF portion 104, a memory portion 106, an LED indicator 108, buttons 110, 112, 114, a speech recognition portion 116 and a voice synthesizer 118. Coupled to the speech recognition portion 116 is a speech input portion 120 and coupled to the voice synthesizer 118 is a voice output portion 122.

The universal transmitter 100 is a remote transmitter device for controlling various types of movable barrier operator systems. In the present description, the universal transmitter 100 is capable of controlling several different brands of movable barrier operator systems when properly programmed to do so. It should be recognized, however, that the principles described and claimed herein are not limited to transmitters that control movable barrier operators, and may be used to control consumer electronics systems including, but not limited to televisions, video recorders, audio receivers and security devices. Additionally, the principles described herein apply to portable transmitters, fixed position transmitters and transmitters, whether portable or fixed position, which include a keypad.

Remote actuating security code responsive systems generally comprise a transmitter and a receiver which receives a transmitted code, authenticates the code and enables a requested function. The manufacturers of such systems have independently chosen several different formats for using a transmitted signal to convey the security code. Once the manufacturers of a system and, in some cases, certain other characteristics of a security code receiver are known, the frequency, code type and format are also known. The systems described herein introduce a voice interactive transmitter which can learn the necessary information from a user to properly program a transmitter for use.

The universal transmitter 100 operates in a learn mode in which necessary characteristics are learned and stored for later transmission and a operate mode in which one of the buttons 110, 112 and 114 is pressed to transmit a code stored in association with the particular button. Beneficially, the universal transmitter 100 allows a user to program each of the buttons 110, 112, 114 by responding to voice prompts produced by the universal transmitter 100 during a programming mode. Through the use of speech input 120 and speech recognition 116 the transmitter 110 may also be trained to recognize voice commands and in response thereto by transmitting the codes associated with buttons 110, 112 and 114.

The RF portion 104 includes hardware which responds to CPU 102 for transmitting security codes over frequencies identified by CPU 102 with specific formats that are encoded in accordance with specific coding schemes depending upon the system type the universal transmitter 100 is programmed to interoperate with. For example, many brands of movable barrier operators utilize frequencies within an inclusive range of 300 to 450 MHz, and two exemplary format protocols used by many brands are pulse width modulation and frequency shift keyed schemes. Basically RF portion 104 is capable of transmitting a security code provided by CPU 102 at a frequency specified by CPU 102 and in a format specified by CPU 102.

The memory portion 106 stores among other data, information about systems that the universal transmitter 100 is designed to interoperate with. The memory portion 106 may be implemented as nonvolatile memory, e.g., standard EEPROM memory. Although the memory portion 106 is shown as a single functional block, those of ordinary skill in the art recognize that the memory portion 106 may be implemented with one or more physical memory elements. The information in the memory portion 106 includes a listing of designations for several different systems, e.g., a listing of brand names and/or manufacturer names. Also, because a particular brand or manufacturer may have models with different frequency, format and/or coding schemes, the memory 106 includes further model designations for each brand or manufacturer designation when relevant. Furthermore, the memory 106 stores information for each supported model of each supported brand or manufacturer that includes frequency, format and coding information. Thus, the memory 106 relates a particular system with information about that system's frequency, format and coding schemes. The LED indicator 108 illuminates to acknowledge that the user's inputs have been received by the universal transmitter 100. It should be recognized that other types of lamps may be implemented instead of a light emitting diode to provide feedback to the user and that other types of acknowledgment could be used. For example, transmitter 100 could provide an acknowledgment by sending a tone or by a synthesized voice response.

The buttons 110, 112, 114 may be push button switches, that a user actuates, to send a signal to control the remote system with which the universal transmitter is to be used. For example, the buttons 110, 112, 114 may be used to initiate movement of a particular movable barrier. That is, button 1 may be trained to control a user's driveway entry gate, button 2 may be trained to control a user's main garage door and button N may be trained to control a user's storage garage. In addition, the buttons 110, 112, 114 may also serve as inputs for the user's responses to the universal transmitter's 100 voice prompts during programming of the universal transmitter 100. At the direction of the CPU 102, the voice synthesizer 118 produces analog speech signals that are transduced to audible speech by the voice output portion 122 which may be a common speaker. The speech recognition portion 116 converts a users's voice commands and/or responses that are received at the speech input portion 120, into a digital representation. The speech input portion 120 is a microphone and could be any device for converting speech to electrical signals.

While referring to FIG. 1, concurrent reference will be made to FIG. 2 which is a flow chart illustrating general steps traversed by the universal transmitter 100 of FIG. 1 when undergoing programming. Although the universal transmitter 100 is generally described as carrying out the steps recited in FIG. 2 and FIGS. 3A–C, one of ordinary skill in the art recognizes that it is the CPU 102 carries out instructions encoded in memory 106, to receive user inputs via either the speech input portion 120 or buttons 110, 112, 114 and provides outputs via the voice synthesizer 118 and voice output portion 122. Thus, the memory portion 106 and the CPU 102 together are generally referred to herein as a processing portion.

A programming mode of the universal transmitter 100 is initiated when the user presses one or more of the buttons in a predetermined sequence (Step 200). For example, the programming mode may be initiated by the user pushing two of the buttons 110, 112, 114 simultaneously until the LED 108 blinks. Alternatively, a separate button (not shown) may be provided to initiate the programming.

Once the programming mode is initiated, the universal transmitter 100 provides an audible prompt requesting that the user select one of the buttons to program (Step 202). The user selects the appropriate button by pressing it after the voice prompt and the universal transmitter 100 receives a button selection from the user (Step 204). To begin programming the selected button, the universal remote 100 audibly questions the user to identify a type of system with which the transmitter is to be used (Step 206).

The audible questions at Step 206 relate to characteristics of the type of system with which the universal remote 100 is to be used. For example, characteristics include a model or series of models for a particular system brand. Other characteristics the universal transmitter 100 questions the user about include physical characteristics, of the user's system. In some embodiments, the audible questions are closed ended questions that are answerable by a single response, e.g., pushing a button or vocally answering "yes" or "no." Although the present embodiment uses closed ended questions, such is not required and open ended questions may be utilized with some price in required processor power and processing time.

After audibly asking a question in step 206 an answer is received in step 208 and a step 209 is performed to determine whether enough information has been accumulated to continue. The goal is the performance of steps 206, 208 and 209 is to identify from the user, enough information to accurately predict the transmission frequency, the code type and the transmission format which are needed to activate the receiver with which the universal transmitter 100 is to operate. The questions needed to be answered by the user are pre-programmed and stored in memory 106 to be used in a search tree-like structure. For example, the ABC brand may use only one frequency, code type and format while the XYZ brand may use different frequencies, code types and formats depending on model number, model name and/or serial number. When a user answers ABC brand to an audible question in block 206 such is received in block 208 and the analysis in block 209 determines that the identify is complete and flow proceeds to a block 210. Alternatively, when the user identifies XYZ brand in response to the block 206 audible question, CPU 102 determines that more questions are needed and what the next question will be to work toward a complete identity. When another question is needed flow proceeds from block 209 to block 206 where the next question e.g., model number is audibly presented to the user.

The universal transmitter 100 initially questions the user about the brand of the user's system and then, if needed, questions the user about the model or series of the system being emulated. For example, assuming the user has selected button one 110 to program, the universal transmitter 100 first requests the user to: "Push button one for Stanley® operators now." The universal transmitter 100 then waits for the user to respond. If after a waiting period the user has not responded by pressing button one (110), the universal transmitter 100 requests the user to: "Push button one for Multi-Code™ operators now." Again, the universal transmitter 100 waits for the user to respond, and if the user does not respond to the prompt, the universal transmitter 100 asks the user whether the user's operator is yet another brand of system operator. To make a selection, the user simply presses button one (110) after hearing the type system being emulated and before the next system type is recited by the universal transmitter 100.

After a user responds in the affirmative to a particular brand name, the universal transmitter 100 queries the user to obtain information about the model or series of the user's operator system, if needed. For example, once the user has provided brand name information to the universal remote, the universal remote 100 queries the user about writing, (e.g., a model name/number or series name) or other features (e.g., color of LEDs) found on the user's existing transmitter or receiver. Thus, the user's responses, which may be "yes" and "no," provide indicia of the user's system type, and allow the universal remote to identify the type of system with which the transmitter is to be used based upon the user's response(s)(Step 209). Once the universal transmitter 100 has identified user's system type (Step 209), and the user's system type does not require DIP switch programming (Step 210), then the flow proceeds to step 216.

If the user's system requires DIP switch programming to program a security code, then the universal transmitter 100 audibly prompts the user with DIP switch setting options (Step 212). For example, the universal transmitter 100 requests the user to: "enter dip switch position 1, button one for on, button two for off." The user then either looks to another one of the system's existing transmitters which is to be emulated (if available) or to the receiver unit with which the universal transmitter is to interact to obtain DIP switch settings.

The user then presses either button one (110) if DIP switch number one is switched to on or presses button two (112) if DIP switch number one is off. After the user has pressed either button one 110 or button two 112, the universal transmitter 100 requests the user to: "enter dip switch position 2, button one for on, button two for off." Again, the user references either another transmitter or the receiver unit to obtain the setting of DIP switch number two and presses either button number one (110) or button number two (112). This process of prompting the user for each DIP switch setting continues until the user has responded to the universal transmitter's 100 request for an entry for each of the number of DIP switches in the user's system. Because of the identification process of steps 206 through 209 the CPU knows the type and number of DIP switches to be emulated.

Some existing systems employ DIP switches having three setting portions and three buttons are utilized to program them a "+," a "–" and a "0". The setting of 3 position switches proceeds as above except that the user is audibly prompted to touch button one to indicate "–", button two to indicate "0" and button 3 to indicate "+". In the preceding description the user responded to the DIP switch setting questions by pressing one of the buttons 110, 112 or 114. Alternatively, the user may respond to the DIP switch questions orally. The speech input converts the oral responses to electrical signals which are analyzed by the speech recognition unit 116 to determine the appropriate DIP switch position. The line of inquiry by the universal transmitter proceeds as with the button press response until all DIP switch positions are known.

Regardless of whether the buttons 110, 112, 114 or the user's speech is used to respond to the universal transmitter's 100 audible questioning, programming is simplified because easy to understand voice commands guide the user step by step through the programming process. Another advantage the universal transmitter 100 provides is DIP switch-type programming without the user actually having to manipulate tiny DIP switches to enter a security code. Furthermore, the universal transmitter's audible questions make it easy for the universal transmitter 100 to identify a particular model by asking the user what the user's transmitter and/or the user's receiver looks like.

After the DIP switches have been positioned in steps 212 and 214 or the CPU 102 has determined in step 210 that DIP switch positions are not needed, a step 216 is performed to store in association with the button being programmed, the learned identities of frequency, security code and format. When DIP switches are used, the security code is the learned switch settings. When DIP switch settings are not required the CPU calculates a security code of the appropriate format and stores the calculated code in association with the button e.g., 110 being programmed. The calculation of security code may comprise reading an appropriate code from a list of such codes stored memory 106 or randomly generating such a code. The appropriate type of the code is identified by the Step 209.

Figure 3A:
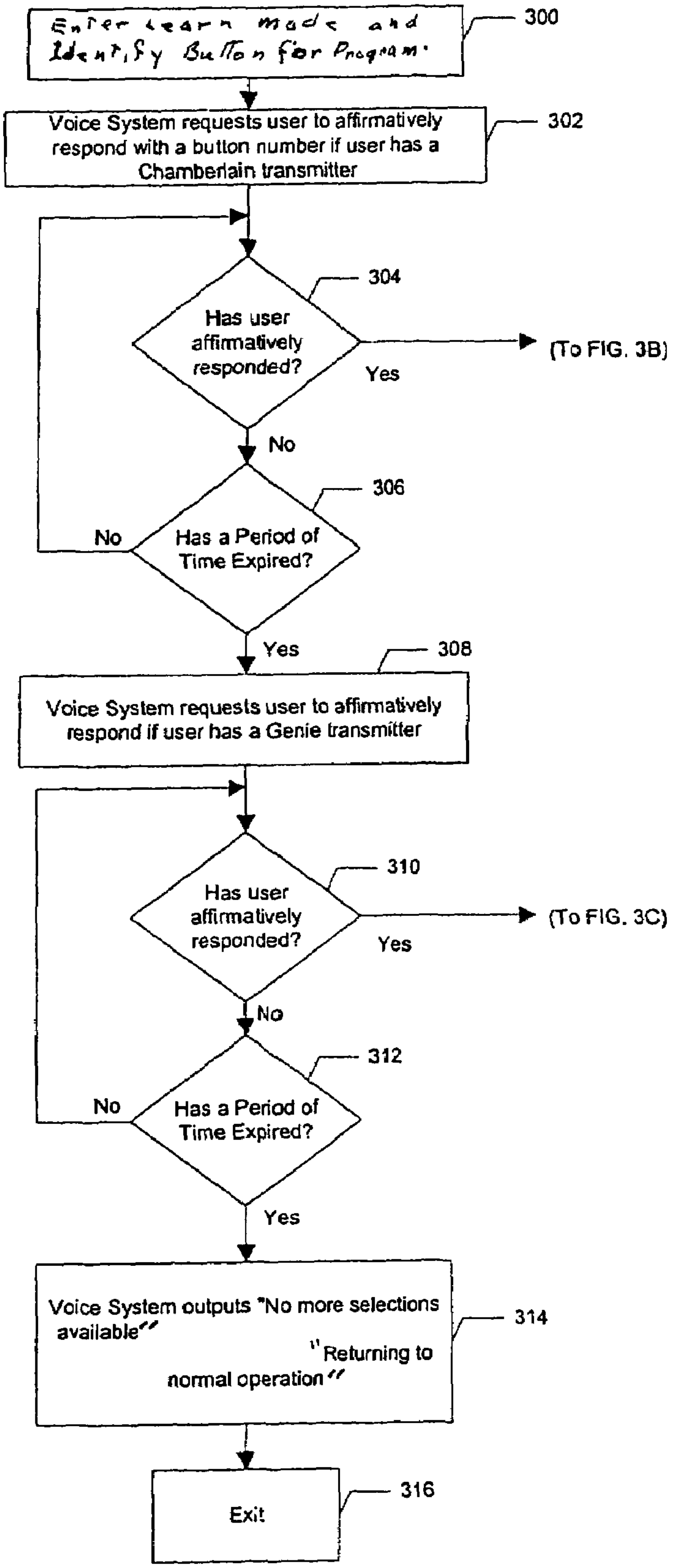
FIGS. 3A, 3B and 3C are flowcharts illustrating steps traversed by the universal transmitter of FIG. 1 when undergoing programming.
Figure 3B:
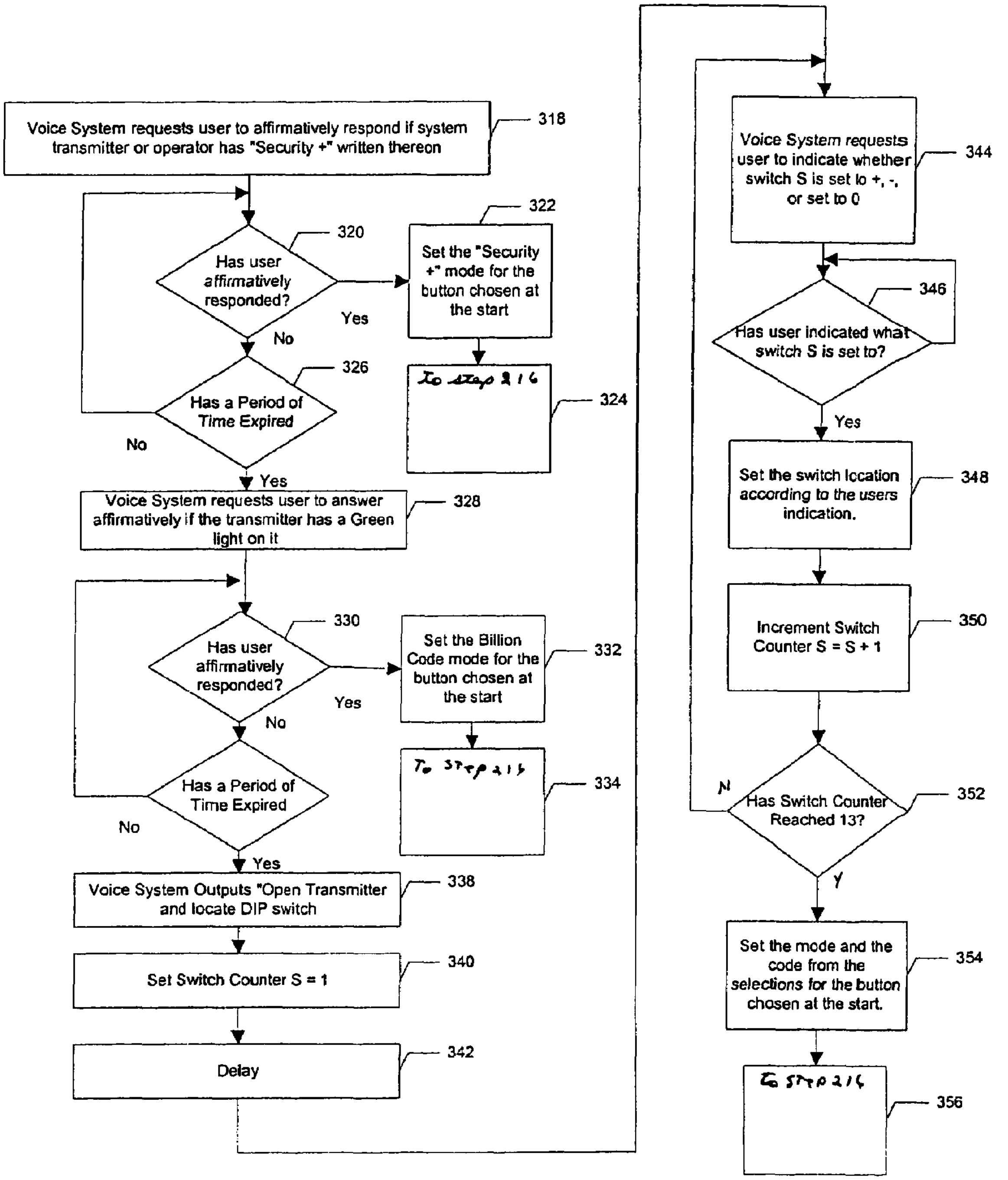
Figure 3C:
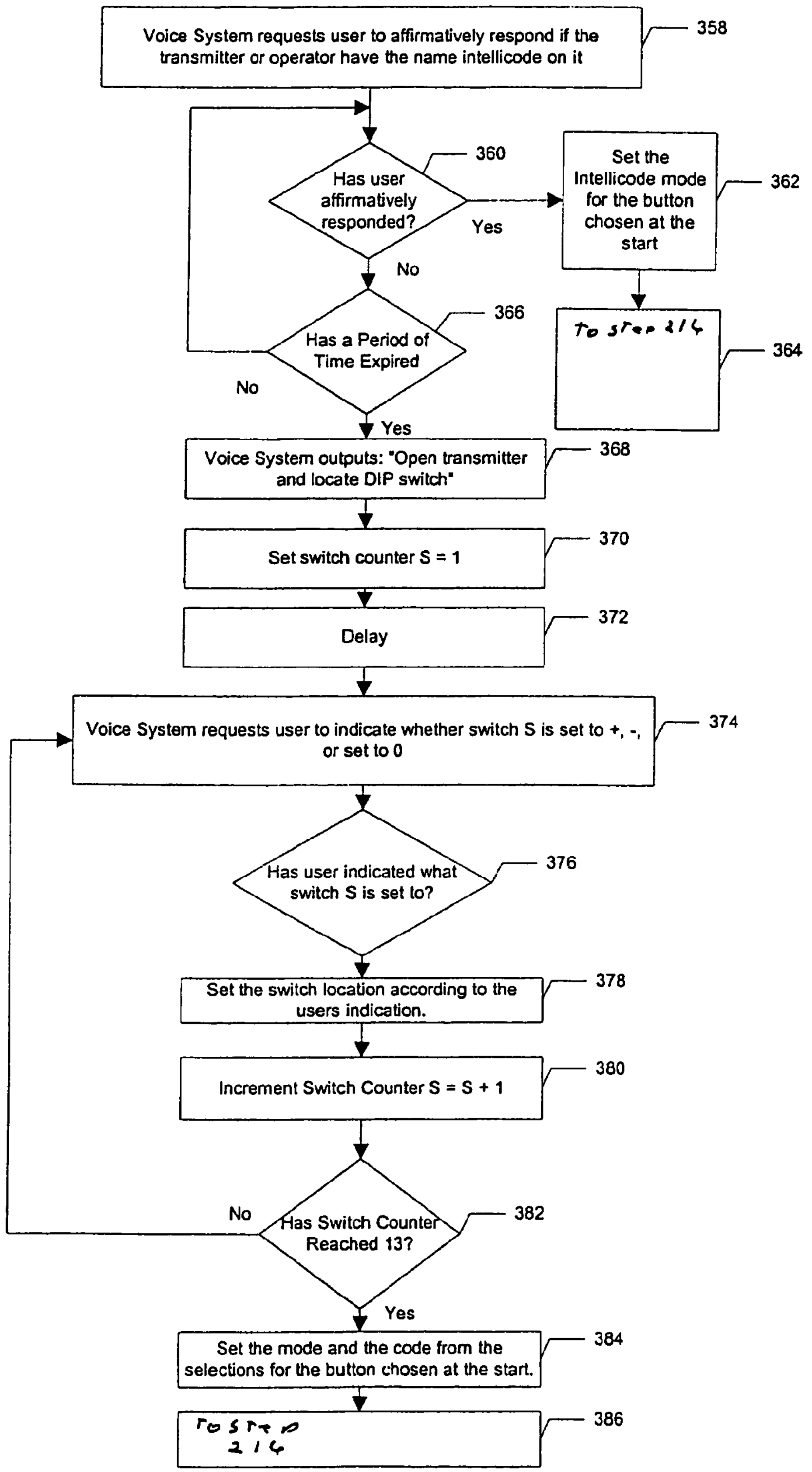

Because different system brands and models often have different identifying characteristics, the universal transmitter 100 carries out specific steps to program specific brands and/or models. FIGS. 3A, 3B, and 3C show the more detailed steps for programming the universal transmitter to interoperate with both Chamberlain® and Genie® brand movable barrier operators up to the performance of Step 216. FIGS. 3A–C illustrate the principles discussed herein as a commercial universal transmitter will comprise additional questions such questions 302 and 308 each of which will be associated with a flow diagram of the type represented in FIGS. 3B and 3C. FIGS. 3A, 3B and 3C recite several steps where the user provides a response to audible questions provided by the universal transmitter 100. It should be recognized that the user responds by pressing one of the universal transmitter's 100 buttons 110, 112, 114, or the user responds with voice commands that are received by the speech input portion 120 as discussed above.

Figure 2:
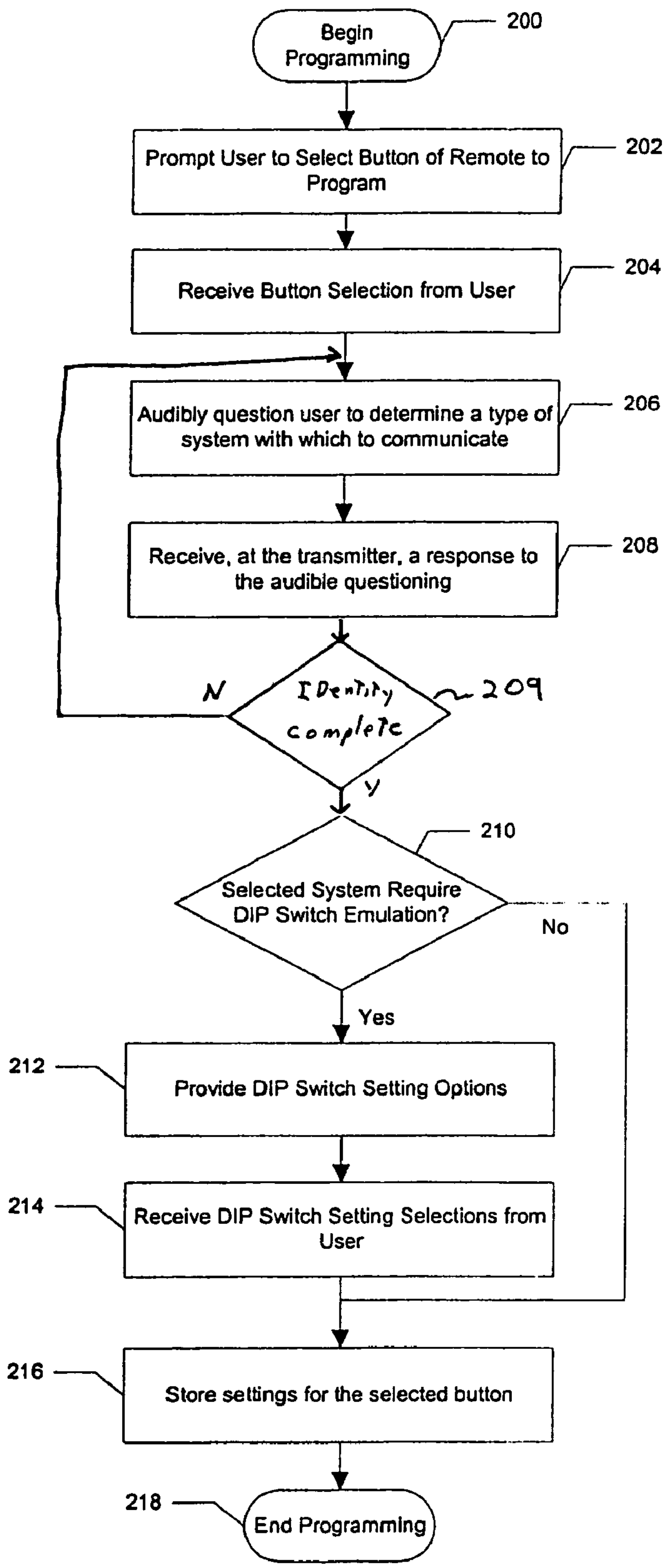
FIG. 2 is a flowchart illustrating general steps traversed by the universal transmitter of FIG. 1 when undergoing programming.

Initially, a Step 300 is performed which is substantially the same as Steps 200–204 of FIG. 2. The user is then requested by voice prompt to affirmatively respond if the user has a Chamberlain® transmitter (Step 302). If the user does not affirmatively respond (Step 304) before a period of time has expired (Step 306), then the voice system of the universal transmitter 100 requests the user to affirmatively respond if the user has a Genie® transmitter (Step 308). If the user still does not respond affirmatively (Step 310) and a period of time has expired (Step 312), then the universal transmitter 100 informs the user that there are no more selections available and that the universal transmitter 100 is returning to normal operation (Step 314). The programming mode is then ended (Step 316). If the user affirmatively responds that the user has a Chamberlain® system (Step 304), the universal transmitter 100 requests that the user affirmatively respond if an existing system transmitter being emulated (or the operator with which the universal remote is to interact) have the name "Security +®" appearing thereon. If the user does affirmatively respond (Step 320), e.g., by saying "yes" or pressing one of the buttons 110, 112, 114, the universal transmitter 100 then sets the "Security +®" (a Chamberlain® rolling code mode) for the button chosen at Step 302, and flow proceed to storage of the frequency, code and format in Step 216.

If the user does not answer affirmatively at Step 320 and a waiting period has expired (Step 326), the universal transmitter 100 requests the user to answer affirmatively if the transmitter being emulated has a green light on it. (Step 228). If the user does respond affirmatively, i.e., indicating that the transmitter has a green light on it (Step 330), then the universal transmitter 100 is set to the "Billion Code" mode, and the universal transmitter 100 then proceeds to Step 216 where the transmission parameters are stored. After a waiting period has expired (Step 336) and the user has not affirmatively responded at Step 330 (indicating that the user does not have either a Security +® or a "Billion Code" system), the universal transmitter 100 requests that the user open an existing transmitter being emulated or the receiver with which it is to interact and locate the DIP switches therein (Step 338). The universal transmitter 100 then sets a switch counter S equal to one to begin learning DIP switch settings.

Next, the universal transmitter 100 provides a delay (Step 342) to allow the user time to locate the DIP switches (Step 342), and then audibly requests that the user indicate whether the switch referenced by counter S is set to a "+", a "–" or "0" (Step 344). As discussed above the DIP switch settings are received from the user as presses of buttons 110, 112 and 114 or voice responses. Once the user has indicated what the DIP switch referenced by counter S is set to (Step 346), then the universal transmitter 100 stores the switch position in memory (Step 348), and the switch counter S is incremented by one (Step 350). If the switch counter S is less than 13, then Steps 344–350 are repeated until a setting is received for each of the system's 13 DIP switches. Once the switch counter reaches 13, then a mode and code based upon the system type and DIP switches respectively is set for the button chosen at the start in Step 302.

Referring back to FIG. 3A, if the user responds affirmatively at Step 310 to indicate that the user has a Genie® system, then as shown in FIG. 3C, the universal transmitter 100 requests the user to affirmatively respond if the transmitter or operator have the name "Intellicode®" located thereon (Step 358). If the user does affirmatively respond (Step 360), then the universal transmitter 100 sets the button chosen at Step 308 to the "Intellicode®" (a Genie® brand rolling code mode), and the universal transmitter 100 proceeds to a storage Step 216. If the user does not respond affirmatively at Step 360 and a waiting period has expired (Step 366), then the universal transmitter 100 requests that the user open an available transmitter or operator and locate DIP switches therein (Step 368). A switch counter S is set to one (Step 370), and a delay is provided (Step 372) to allow time for the user to find the DIP switches before the universal transmitter 100 requests the user to indicate whether switch S is set to "+," "–," or "0" (Step 374). The user then responds by pressing one or more of the buttons 110, 112, 114 or by giving voice responses. Once the user responds to indicate what the switch referenced by the counter S is set to (Step 376), then the setting for the switch is stored in memory (Step 378), and the switch counter S is incremented by one (Step 380).

If the switch counter is less than 13 (Step 382), then Steps 374–380 are repeated until the switch counter S is 13. Once the switch counter S reaches 13, then the button chosen at Step 308 is set to the mode and the code that corresponds to Genie® brand products without Intellicode® and the DIP switch settings respectively. Flow then proceeds to Step 216 to record the frequency, code and format for the push button previously indicated.

While the invention herein disclosed has been described by the specific embodiments and applications thereof, numerous modifications and variations could be made thereto by those skilled in the art without departing from the scope of the invention set forth in the claims.

What is claimed is:

1. A method for programming a transmitter for use in a system including an existing transmitter comprising the steps of:

audibly questioning a user, by the transmitter, to determine a type of system with which the transmitter is to be used and using questions relating to characteristics of the existing transmitter;

receiving, at the transmitter from the user, a response to the audibly questioning step; and identifying the type of system with which the transmitter is to be used based on the response to the audibly questioning step.

2. The method of claim 1, wherein the identifying step identifies a DIP switch type system and comprising:

audibly providing to the user switch setting options; and receiving DIP switch setting selections from the user.

3. The method of claim 1, wherein the system with which the transmitter is to be used includes a receiver and the method includes audibly questioning the user, by the transmitter, using questions relating to characteristics of the receiver.

4. The method of claim 1, wherein the step of audibly questioning the user comprises audibly questioning the user about characteristics of the type of system.

5. The method of claim 4, wherein the step of audibly questioning the user about characteristics of the type of system comprises audibly questioning the user about characteristics of the system with closed ended questions.

6. The method of claim 5, wherein the step of receiving a response comprises receiving a voice input from the user, wherein the voice input is selected from the group consisting of: "yes" and "no".

7. The method of claim 4, wherein the step of audibly questioning the user about characteristics of the type of system comprises questioning the user about physical characteristics of the type of system.

8. The method of claim 4, wherein the step of audibly questioning includes audibly questioning the user about a brand of the operator system.

9. The method of claim 1, wherein the step of receiving a response comprises receiving a voice response from the user.

10. A method of programming a transmitter of claim 1 wherein the transmitter comprises a push button and the method comprises receiving an indication of a push button activation by the user.

11. A method of claim 1 wherein the step of audibly questioning includes audibly questioning the user about a model of the transmitter.

12. A method of claim 1 wherein the step of audibly questioning includes audibly questioning the user about a series of the transmitter.

13. A method of claim 1 wherein the step of audibly questioning includes audibly questioning the user about a color of the transmitter.

14. A method of claim 1 wherein the step of audibly questioning includes audibly questioning the user about a color of an LED of the transmitter.

15. A method of claim 1 wherein the step of audibly questioning includes audibly questioning the user about text markings on the transmitter.

16. A programmable transmitter comprising:

a radio frequency transmitter;

a user input control for receiving a user input; and a processing portion configured to operate a voice synthesizer to audibly question a user to determine a type of system with which the transmitter is to be used;

wherein the processing portion is configured to receive a response via the user input control, identify the type of system with which the transmitter is to be used, and set the transmitter to transmit at a frequency for the type of system via the radio frequency transmitter.

17. The programmable transmitter of claim 16, wherein the user input control comprises a speech recognition portion coupled to the processing portion.

18. The programmable transmitter of claim 16, wherein the processing portion comprises a memory portion, and the memory portion stores data identifying security code transmission characteristics associated with the identified type of system.

19. The programmable transmitter of claim 16, comprising a memory for storing type data identifying a plurality of types of systems.

20. The programmable transmitter of claim 19, wherein the memory stores attribute data identifying transmission characteristics for a plurality of types of systems.

21. A programmable transmitter comprising:

means for questioning a user with audible questions to determine a radio frequency of communication of a system with which the programmable transmitter is to be used;

means for receiving a response from the user in response to the audible questions;

means for identifying the radio frequency of communication of the system with which the transmitter is to be used based on the received response; and means for setting the programmable transmitter to transmit at the identified radio frequency.

22. The programmable transmitter of claim 21, comprising:

means for providing audible DIP switch setting options; and means for receiving DIP switch setting selections from the user.

23. The programmable transmitter of claim 22, wherein the type data for each type of system is associated a portion of the attribute data.

24. The programmable transmitter of claim 21, wherein the means for questioning the user comprises means for audibly questioning the user about characteristics of the system from which radio frequency can be determined.

25. The programmable transmitter of claim 24, wherein the means for audibly questioning the user about characteristics of the system comprises means for audibly questioning the user about characteristics of the system with closed ended questions.

26. The programmable transmitter of claim 25, wherein the means for receiving a response comprises means for receiving a voice input from the user, wherein the voice input is selected from the group consisting of: "yes" and no.

27. The programmable transmitter of claim 24, wherein the means for audibly questioning the user about characteristics of the system comprises means for audibly questioning the user about physical characteristics of the system.

28. The programmable transmitter of claim 24, wherein the means for audibly questioning the user comprises means for audibly questioning the user about a brand of the system.

29. The programmable transmitter of claim 21, wherein the means for receiving a response comprises means for receiving a voice response from the user.

* * * * *

UNITED STATES PATENT AND TRADEMARK OFFICE

CERTIFICATE OF CORRECTION

PATENT NO. : 7,181,203 B2 Page 1 of 1
APPLICATION NO. : 10/624053
DATED : February 20, 2007
INVENTOR(S) : Eric Michael Gregori It is certified that error appears in the above-identified patent and that said Letters Patent is hereby corrected as shown below:

Claim 26, Column 10, Line 29; Change “ no ” to -- “no” --.

Signed and Sealed this

Seventeenth Day of April, 2007

JON W. DUDAS
*Director of the United States Patent and Trademark Office*